(12) United States Patent
Armitage

(10) Patent No.: US 9,229,609 B2
(45) Date of Patent: Jan. 5, 2016

(54) NAVIGABLE VISUALIZATION OF A HIERARCHICAL DATA STRUCTURE

(75) Inventor: John Armitage, Berkeley, CA (US)

(73) Assignee: SAP SE, Walldorf (DE)

( * ) Notice: Subject to any disclaimer, the term of this patent is extended or adjusted under 35 U.S.C. 154(b) by 372 days.

(21) Appl. No.: 13/222,401

(22) Filed: Aug. 31, 2011

(65) Prior Publication Data

US 2013/0055146 A1    Feb. 28, 2013

(51) Int. Cl.
G06F 3/048    (2013.01)
G06F 3/0481   (2013.01)
G06T 11/20    (2006.01)
G06F 17/30    (2006.01)

(52) U.S. Cl.
CPC ........ *G06F 3/0481* (2013.01); *G06F 17/30994* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 2005/0273730 A1* | 12/2005 | Card et al. | 715/853 |
| 2006/0070013 A1* | 3/2006 | Vignet | 715/854 |
| 2008/0109740 A1* | 5/2008 | Prinsen et al. | 715/764 |
| 2008/0307369 A1* | 12/2008 | Liu et al. | 715/855 |
| 2010/0095235 A1* | 4/2010 | Bennett et al. | 715/781 |
| 2010/0231595 A1* | 9/2010 | Dang et al. | 345/440 |

* cited by examiner

*Primary Examiner* — William Bashore
*Assistant Examiner* — Hien Duong
(74) *Attorney, Agent, or Firm* — Schwegman Lundberg & Woessner, P.A.

(57) ABSTRACT

An example system generates, for a target data set, a navigable space based upon quantitatively-visualized menus. The navigable space is provided within a viewing area on a display device and comprises a stacked bar chart at the left end of a viewing area and, on the right end of the viewing area, a bar graph comprising set of bars. The stacked bar chart is also usable as an actionable menu.

14 Claims, 9 Drawing Sheets

NAVIGABLE VISUALIZATION OF A HIERARCHICAL DATA STRUCTURE

TECHNICAL FIELD

This application relates to the technical fields of software and/or hardware technology and, in one example embodiment, to system and method to navigate a visual representation of a hierarchical structure.

BACKGROUND

Some common ways of visualizing a data set having items associated with respective values are stacked bar graphs and pie charts where data is represented a in a way that illustrates percentage breakdown of a whole into its parts. A bar graph, for example, is a graph with rectangular bars with lengths proportional to the values that they represent. Each rectangular bar of a bar graph may represent a category within the associated data set.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
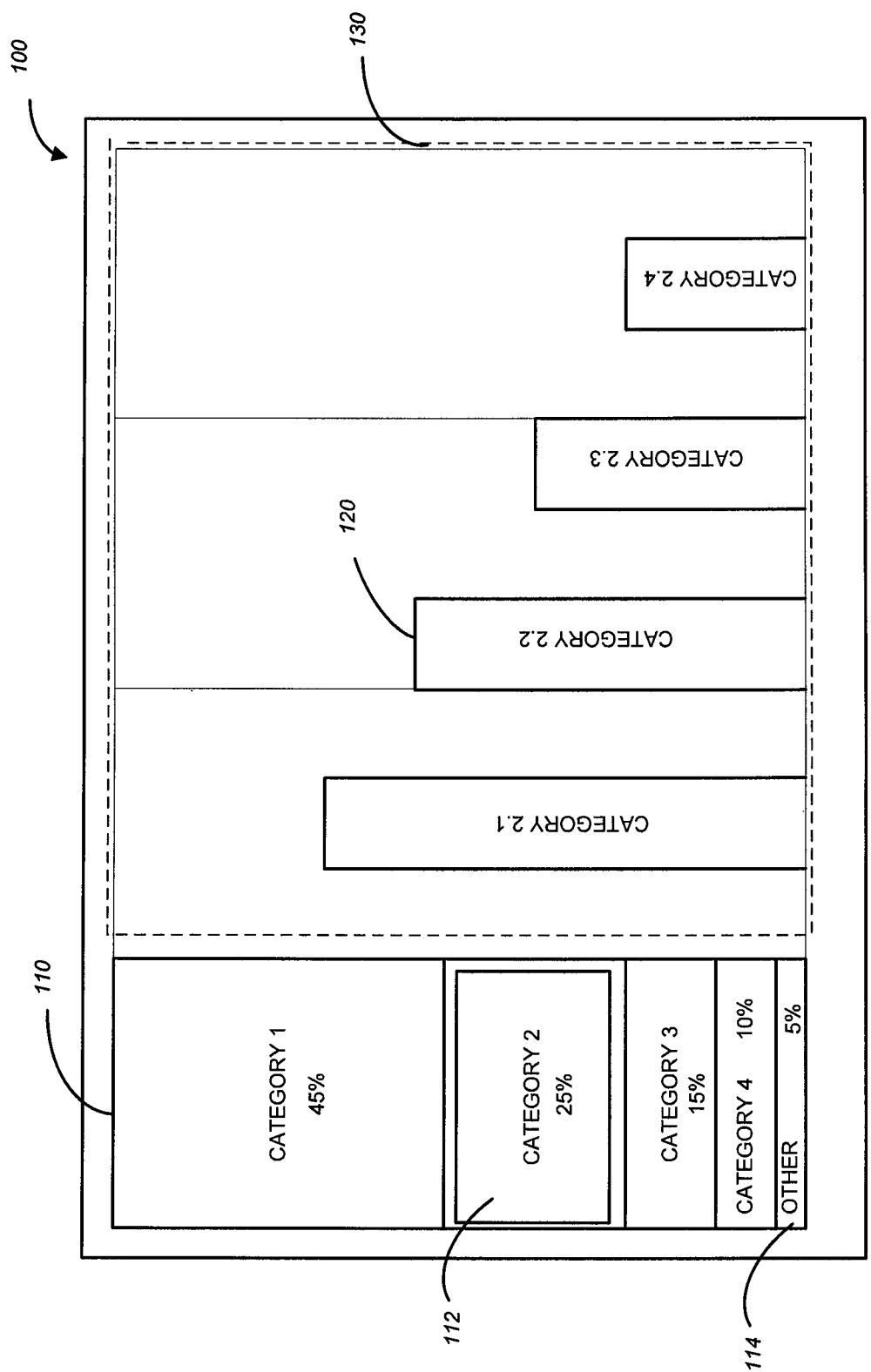
FIG. 1 is a graphical user interface comprising an example view rendered by a system for visualizing and navigating a quantitative hierarchical data set, in accordance with one example embodiment.

A method and system for visualizing and navigating a quantitative hierarchical data set on a computer device is described. In the following description, for purposes of explanation, numerous specific details are set forth in order to provide a thorough understanding of an embodiment of the present invention. It will be evident, however, to one skilled in the art that the present invention may be practiced without these specific details.

Business software users may benefit from an efficient and responsive way to search and explore quantitatively-structured data in order to support decision-making. Providing an intuitive, navigable visualization of hierarchical structures is important to users' understanding of how large sets of hierarchically-structured data are broken into categories. Generating a representation of a target data set in the form of a hierarchical chart provides a visualization of how a quantity of business data is divided up based on the categories of data in the data set using a stacked bar graph that can be drilled down to reveal sub-categories.

In one example embodiment, a system for visualizing and navigating a quantitative hierarchical data set generates, for a target data set, a navigable space based upon quantitatively-visualized menus. The navigable space is provided within a viewing area on a display device and comprises a stacked bar chart at the left end of a viewing area and, on the right end of the viewing area, a bar graph comprising set of bars. The stacked bar chart, also termed a strip or a strip chart, represents a hierarchical level in the data set and comprises a plurality of segments, where each segment represents a category from the data set. The area occupied by a segment in the strip chart reflects quantitative contribution of the associated category to a numerical aspect assigned to the entire set of categories in the associated level of the data set. The rendering of a navigable visualization of a hierarchical data structure may be driven by a grid underlying the display area within which one or more strip charts and a set of bars are to be rendered. The strip chart generated by a system for visualizing and navigating a quantitative hierarchical data set is also usable as a clickable menu.

For example, a segment in the strip chart may comprise a visual control that can be used to request displaying the details of data within the associated category having sub-categories of its own. These details may be displayed in a so-called plain area of the viewing area, as a set of bars representing values associated with respective subcategories. The visual control associated with a segment may respond to a single tap/click by presenting a set of bars in the plain area. In response to a double tap/double click, the visual control associated with a segment representing a category may respond by presenting another strip chart, where the segments represent the subcategories of the category. This second strip chart may replace the first strip chart (the parent strip chart) or it may be presented adjacent to the first strip chart. This pattern can be repeated recursively to any depth of drill-down that contains data. Users can also navigate back to parent strip charts using mouse/touch input, e.g., by swiping a strip chart to the right, which causes the associated parent strip chart to be revealed. In addition to being an intuitive navigation model, an example system to generate and render hierarchical strip charts may also be optimized for displaying typographic labels within the geometric screen areas of the segments in the strip chart.

FIG. 1 is a graphical user interface comprising an example view 100 rendered by a system for visualizing and navigating a quantitative hierarchical data set, in accordance with one example embodiment. The view 100 is generated based on a target data set and displays a strip chart 110 and a set of bars 120 presented in a plain area 130. The strip chart 110 comprises segments representing a set of categories from the target data set. The segments are labeled according to their respective corresponding categories "CATEGORY 1," "CATEGORY 2," "CATEGORY 3," "CATEGORY 4." The segments also show their respective percentage contribution to the numerical aspect associated with all categories as a whole. As shown in the view 100, "CATEGORY 1" contributed 45%, "CATEGORY 2" contributed 25% "CATEGORY 3" contributed 15%, "CATEGORY 4" contributed 10%. The last segment in the strip chart 110 (reference numeral 114) is labeled "OTHER." The segment 114 is a so-called combination segment that represents categories, for which respective values (percentage contributions to the numerical aspect associated with all categories in the associated hierarchical level as a whole) are below a predetermined minimum value.

The plain area 130 displays a set of bars that represents quantitative breakdown of sub-categories of a particular selected category. Shown in the view 100, the selected category is "CATEGORY 2" identified with reference numeral 132. The bars shown in the plain area 130 represent respective values of the sub-categories "CATEGORY 2.1," "CATEGORY 2.2," "CATEGORY 2.3," and "CATEGORY 2.4." The segment, for which a set of bars is presented in the plain area 130, may be selected manually (e.g., by tapping/clicking on the segment) or by default. A segment, for which the plain area 130 displays a set of bars, may be highlighted in some manner, e.g., by presenting a double border as shown by reference numeral 112.

Figure 2:
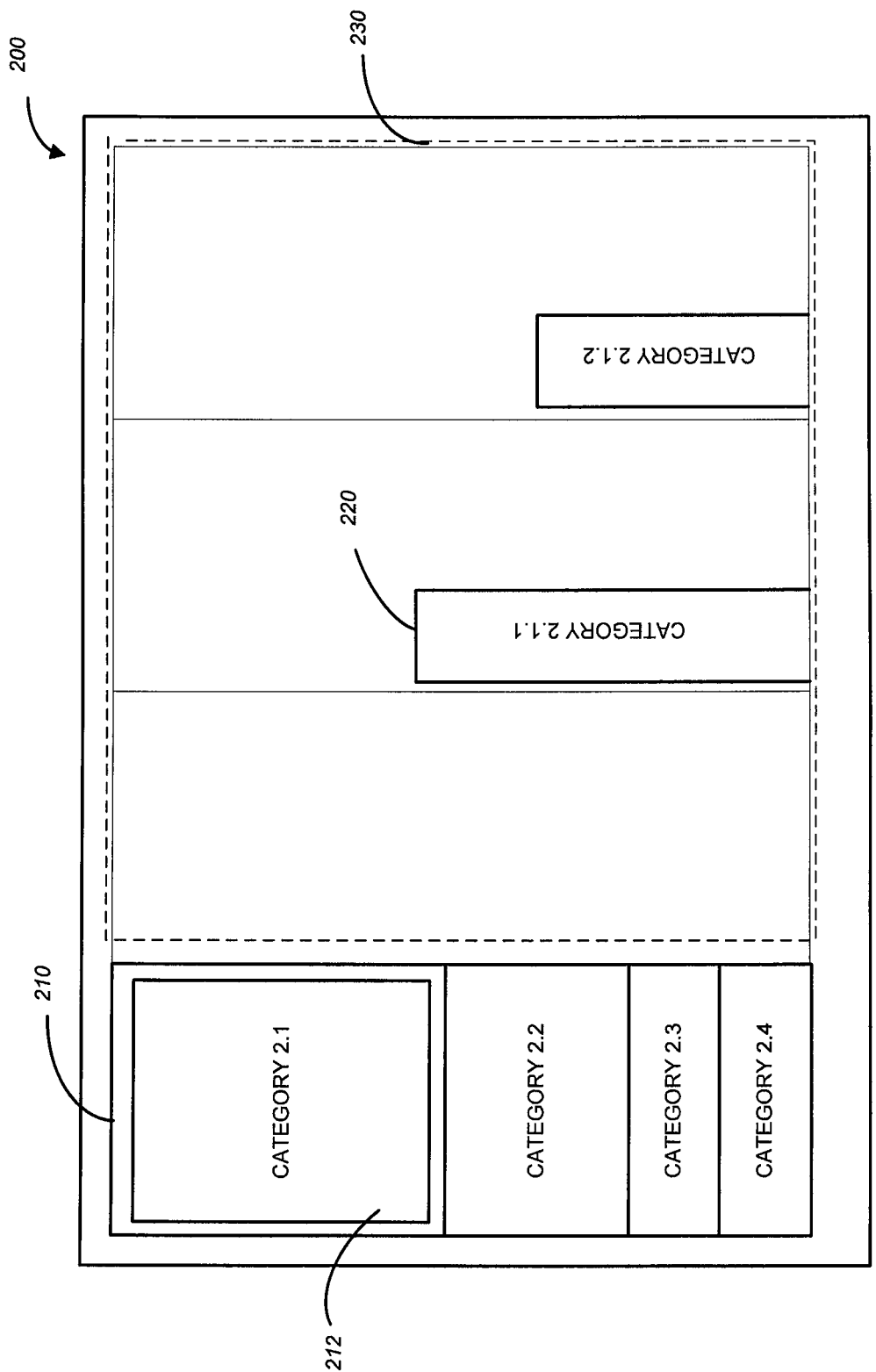
FIG. 2 graphical user interface comprising another example view rendered by a system for visualizing and navigating a quantitative hierarchical data set, in accordance with one example embodiment.

The segments of the strip chart 110 may comprise respective visual controls. Activating a visual control associated with a segment (e.g., tapping or clicking on a segment) results in presenting, in the plain area 130, the set of bars associated with a category corresponding to the clicked/tapped segment. Activating a visual control associated with a segment by, e.g., double-tapping or double-clicking on a segment, results in presenting a new strip chart, associated with sub-categories of a category corresponding to the segment. FIG. 2 illustrates an example view rendered by a system for visualizing and navigating a quantitative hierarchical data set in response to a request associated with a segment.

As shown in FIG. 2, a strip chart 210 comprises segments corresponding to sub categories of "CATEGORY 2" shown in FIG. 1. The strip chart 210 comprises segments "CATEGORY 2.1," "CATEGORY 2.2," "CATEGORY 2.3," and "CATEGORY 2.4." The plain area 230 displays a set of bars that represents quantitative breakdown of sub-categories "CATEGORY 2.1." As mentioned above, the segment, for which a set of bars is presented in the plain area 230, may be selected manually (e.g., by tapping/clicking on the segment) or by default.

Figure 3:
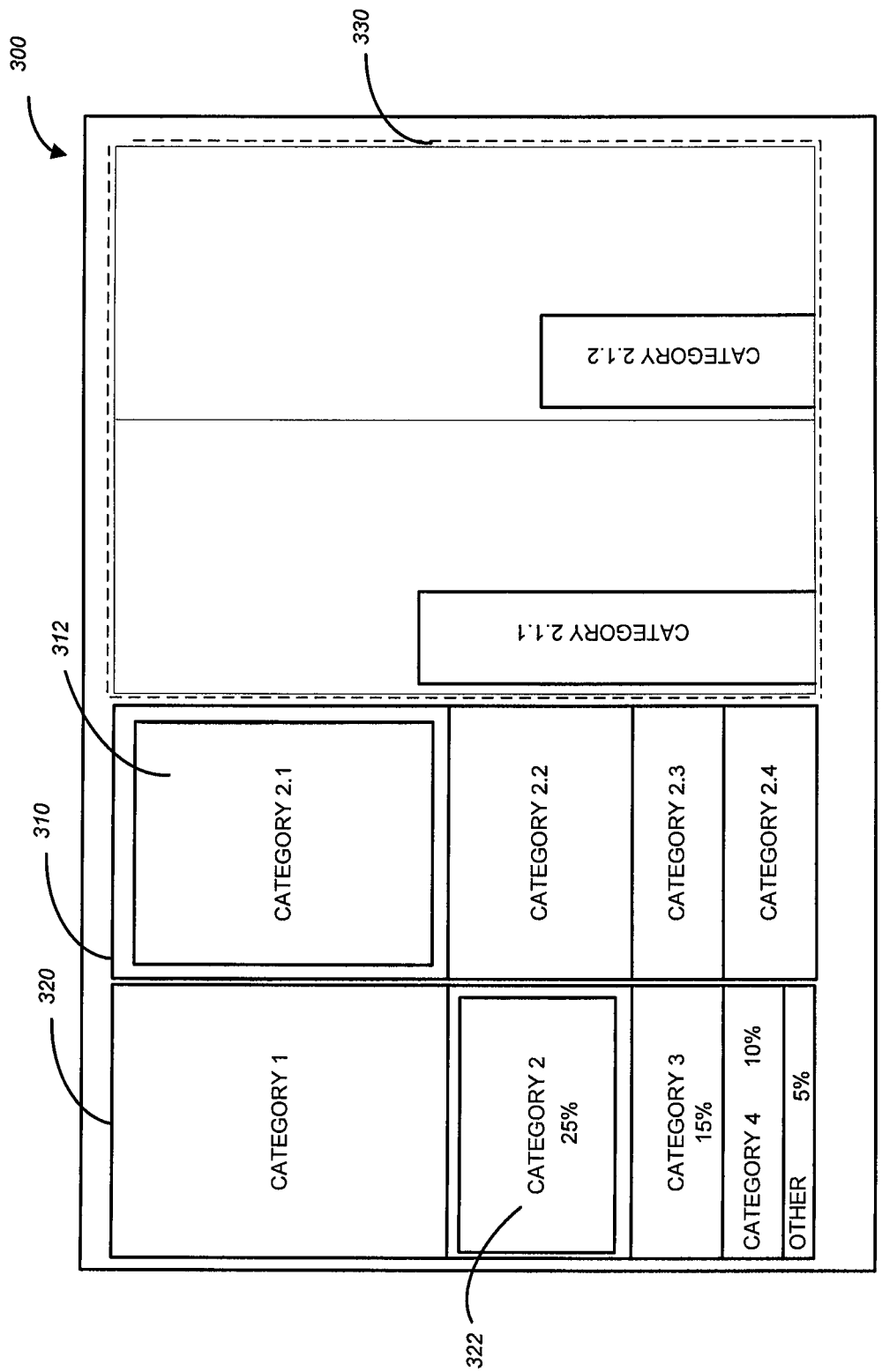
FIG. 3 illustrates two strip charts presented contemporaneously in the viewing area, in accordance with one example embodiment.
Figure 4:
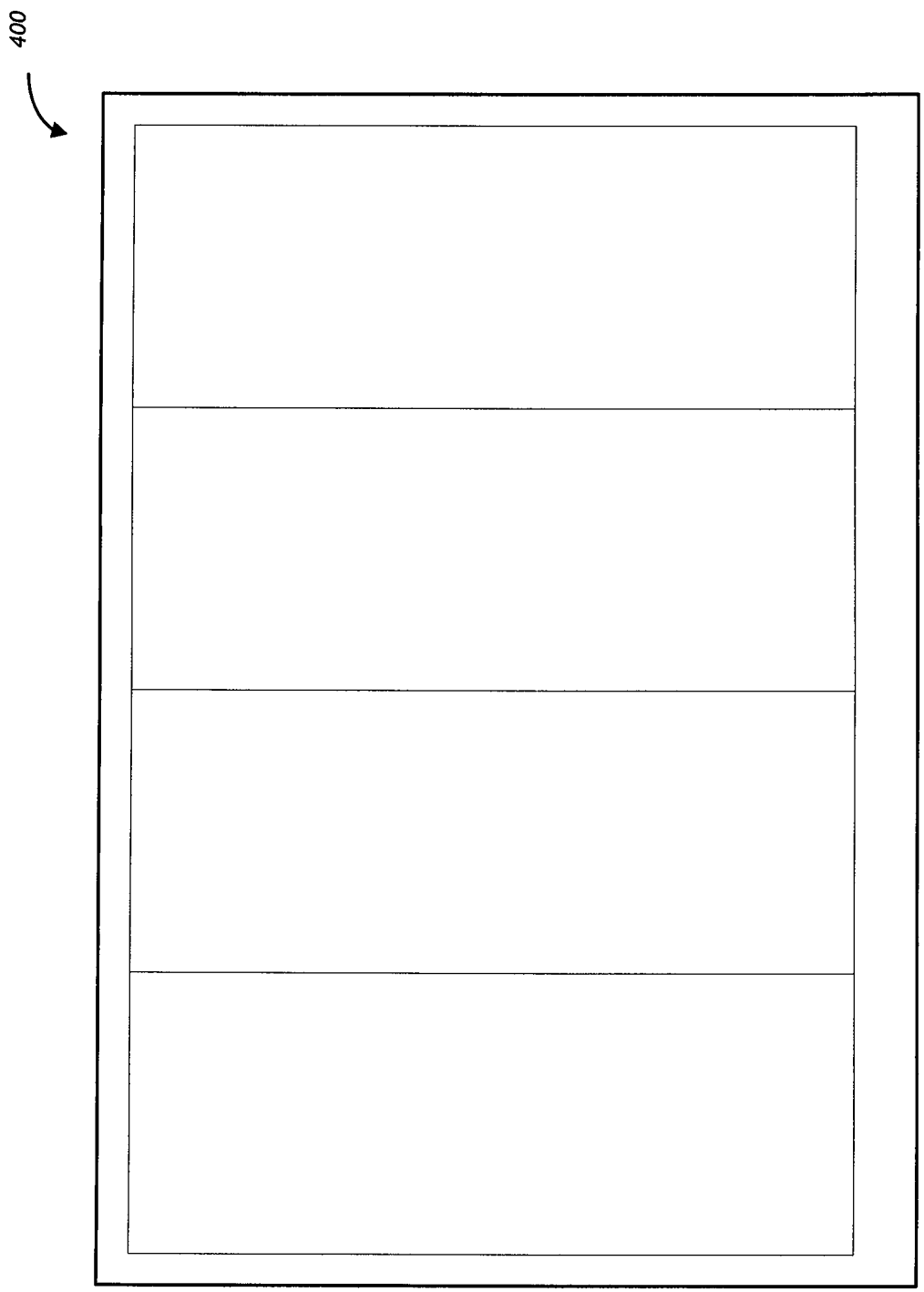
FIG. 4 is a representation of a grid for positioning one or more strip charts and a plain area, in accordance with one example embodiment.
Figure 5:
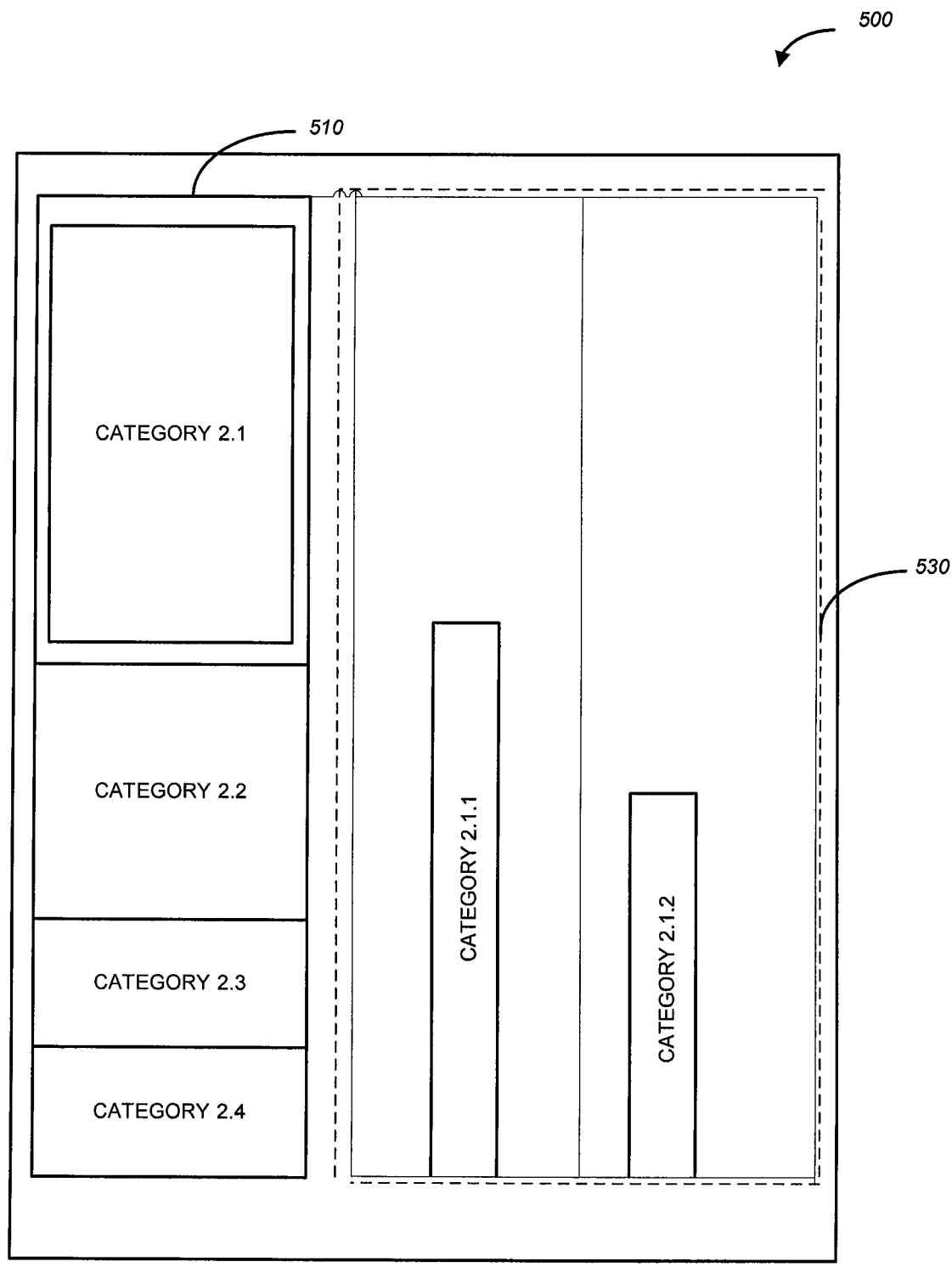
FIG. 5 is a graphical user interface illustrating an example strip chart presented on a display device in a portrait mode, in accordance with one example embodiment.

In some embodiments, a user may be permitted to view, simultaneously more than one strip charts (e.g., respective strip charts generated for a parent and child levels in a hierarchical data structure), e.g., by dragging/swiping a currently-displayed strip chart to the right. FIG. 3 illustrates two strip charts presented contemporaneously in the viewing area. In the example illustrated in FIG. 1-3, dragging to the right the strip chart 210 shown in FIG. 2 reveals a strip chart 320 shown in FIG. 3 in addition to the strip chart 310. As can be seen in FIG. 3, a segment 312 corresponding to "CATEGORY 2.1" is highlighted to indicate that the set of bars shown in the plain area 330 correspond to that category. A segment 322 in the strip chart 320 is highlighted to indicate that the strip chart 310 corresponds to that category. As mentioned above, the rendering of a navigable visualization of a hierarchical data structure is driven by a grid underlying the display area within which one or more strip charts and a set of bars are to be rendered. A graphical representation 400 of such a grid is shown in FIG. 4. FIG. 5 is a graphical user interface illustrating an example strip chart presented on a display device in a portrait mode, in accordance with one example embodiment.

Figure 6:
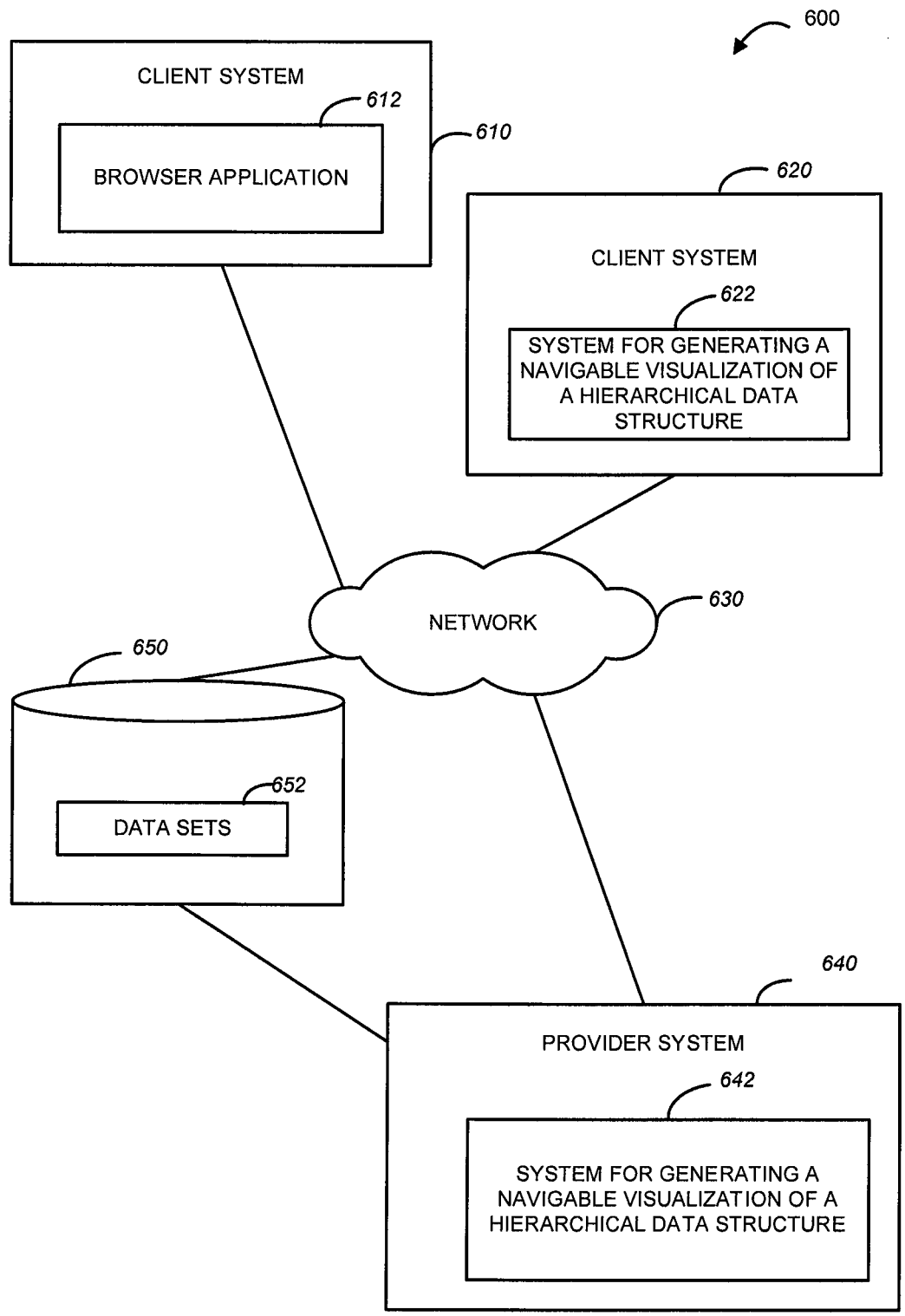
FIG. 6 is a diagrammatic representation of a network environment within which an example method and system for visualizing and navigating a quantitative hierarchical data set may be implemented.

An example method and system to generate navigable visualization of a hierarchical data structure may be implemented in the context of a network environment 600 illustrated in FIG. 6.

As shown in FIG. 6, the network environment 600 may include client systems 610 and 620 and a server system 640. The server system 640, in one example embodiment, may host an on-line trading platform. The client system 610 and 620 may host a browser application 612 and may have access to the server system 640 via a communications network 630. The communications network 630 may be a public network (e.g., the Internet, a wireless network, etc.) or a private network (e.g., a local area network (LAN), a wide area network (WAN), Intranet, etc.).

The client system 610 may utilize the browser application 612 to access services provided by the server system 640. For example, the server 640 may host a system 642 to generate navigable visualization of a hierarchical data structure. A system to generate navigable visualization of a hierarchical data structure, in one embodiment, bay be executing at a client computer system, such as, e.g., a system to generate navigable visualization of a hierarchical data structure 622 executing at the client system 620. As shown in FIG. 6, a system to generate navigable visualization of a hierarchical data structure may be configured to access hierarchical data sets that are stored at a client or a server computer system (not shown) or at a remotely-located repository. An example remote repository 650 is shown in FIG. 6 as storing data sets 652. An example system to generate navigable visualization of a hierarchical data structure may be described with reference to FIG. 7.

Figure 7:
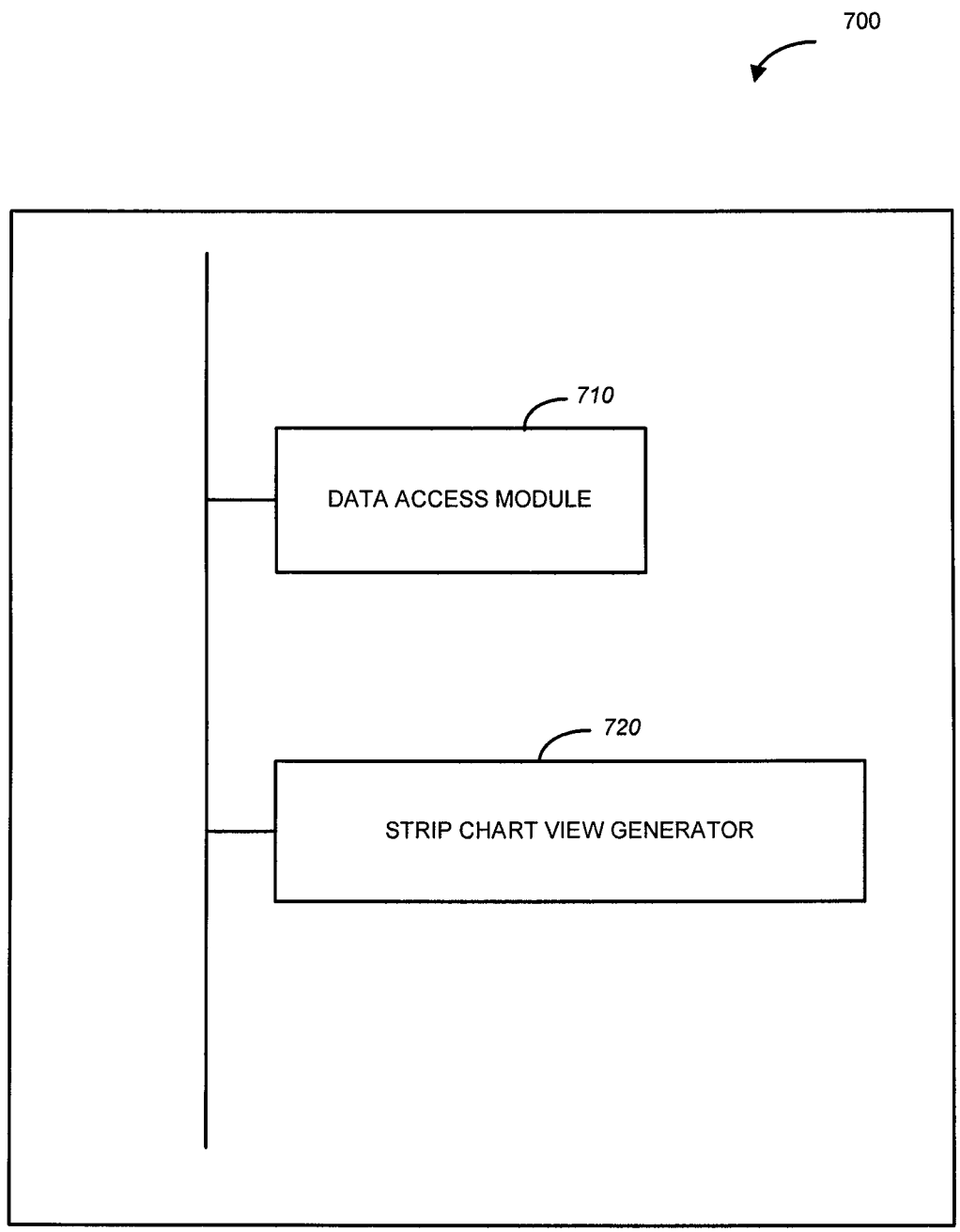
FIG. 7 is block diagram of a system for visualizing and navigating a quantitative hierarchical data set, in accordance with one example embodiment.

FIG. 7 is a block diagram of a system 700 to generate navigable visualization of a hierarchical data structure. The system 700 may be implemented in software, hardware, or a combination thereof. In one embodiment, the system 700 comprises a memory, at least one processor coupled to the memory, a data access module 710 configured to access a hierarchical data structure, and a strip chart view generator 720 to generate a strip chart representing a level in the hierarchical data structure, using at least one processor. Example navigable strip chart views that may be generated by the strip chart view generator 720 are shown in FIG. 1-5. An example method to generate navigable visualization of a hierarchical data structure can be described with reference to FIG. 8.

Figure 8:
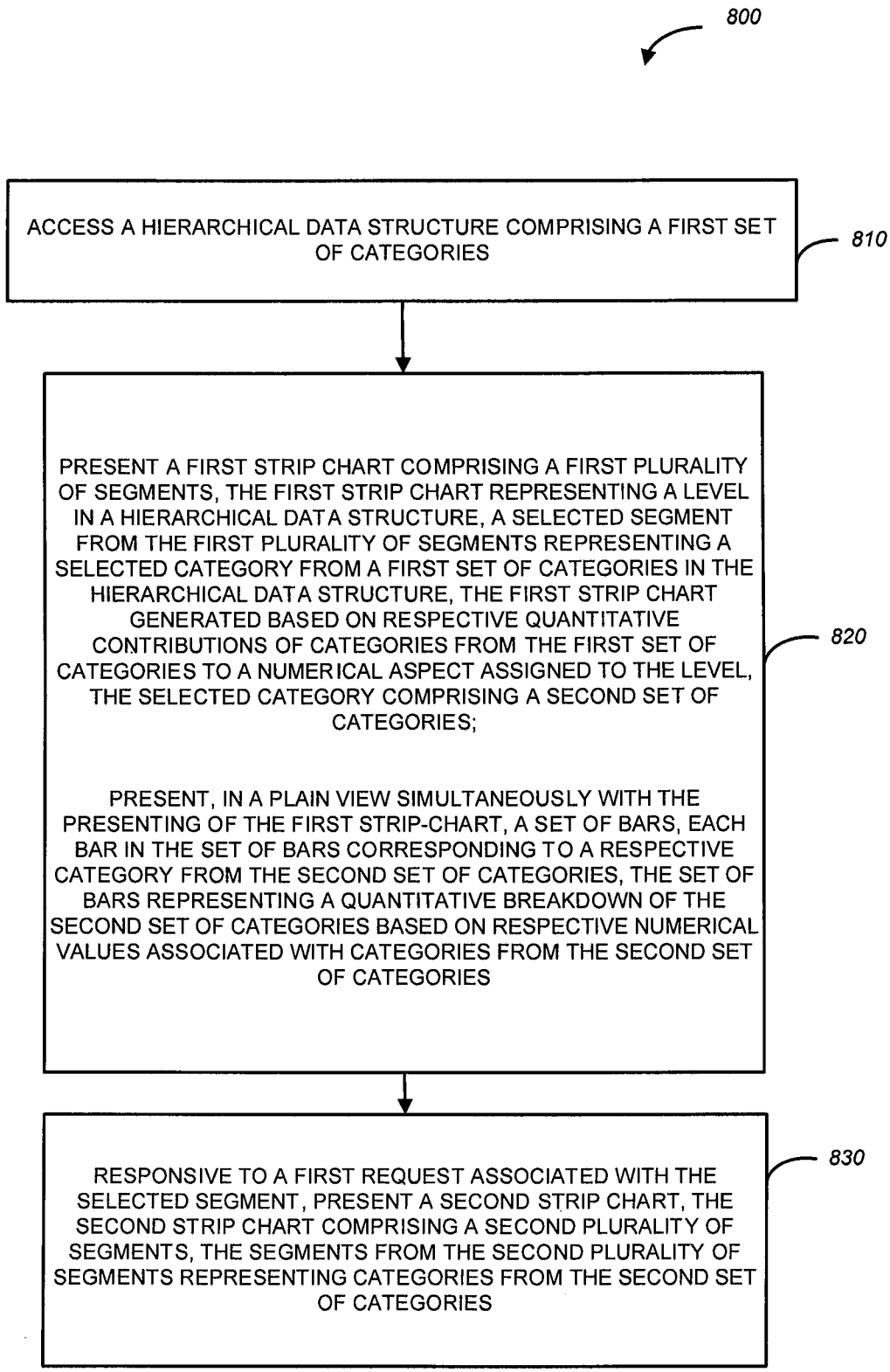
FIG. 8 is a flow chart of a method for visualizing and navigating a quantitative hierarchical data set, in accordance with an example embodiment.

FIG. 8 is a flow chart of a method 800 to generate navigable visualization of a hierarchical data structure, according to one example embodiment. The method 800 may be performed by processing logic that may comprise hardware (e.g., dedicated logic, programmable logic, microcode, etc.), software (such as run on a general purpose computer system or a dedicated machine), or a combination of both. In some embodiments, the processing logic resides at the server system 640 or the client system 620 of FIG. 6 and includes modules shown in FIG. 7.

As shown in FIG. 8, the method 800 commences at operation 810, when the data access module 710 of FIG. 7 accesses a hierarchical data structure comprising a set of categories. At operation 820, the strip chart view generator 720 of FIG. 7 presents a first strip chart comprising a first plurality of segments in a viewing area and also presents a set of bars in a plain area of the viewing area, where each bar in the set of bars corresponds to a respective sub-category of a category associated with a selected segment in the first strip chart. A segment from the first strip chart may be selected by default or in response to a user's interaction (e.g., a click or a tap) with a visual control associated with the segment. The first strip chart represents a level in a hierarchical data structure and is generated based on respective quantitative contributions of categories from the first set of categories to a numerical aspect assigned to the level.

At operation 830, in response to a user's interaction indicating a request to drill down into a segment in the first strip chart, the strip chart view generator 720 presents a second strip chart. The second strip chart comprises segments representing subcategories of the category associated with the segment that was the subject of the request to drill down. As mentioned above, the second strip chart may replace the first strip chart or be presented adjacent to the first strip chart, based on a grid underlying the viewing area.

A further operation performed by the method 800 may include replacing the set of bars in the plain view with a further set of bars, the bars from the further set of bars representing a quantitative breakdown of a set of categories associated with the segment from the second plurality of segments in response to a second request (e.g., another single tap or a single click) associated with a segment from the second plurality of segments. Still further operations performed by the method 800 include detecting a request associated with the second strip chart and, in response to the detecting of the request associated with the second strip chart (e.g., a swiping motion) presenting the first strip chart in the viewing area to the left of the second strip chart.

Figure 9:
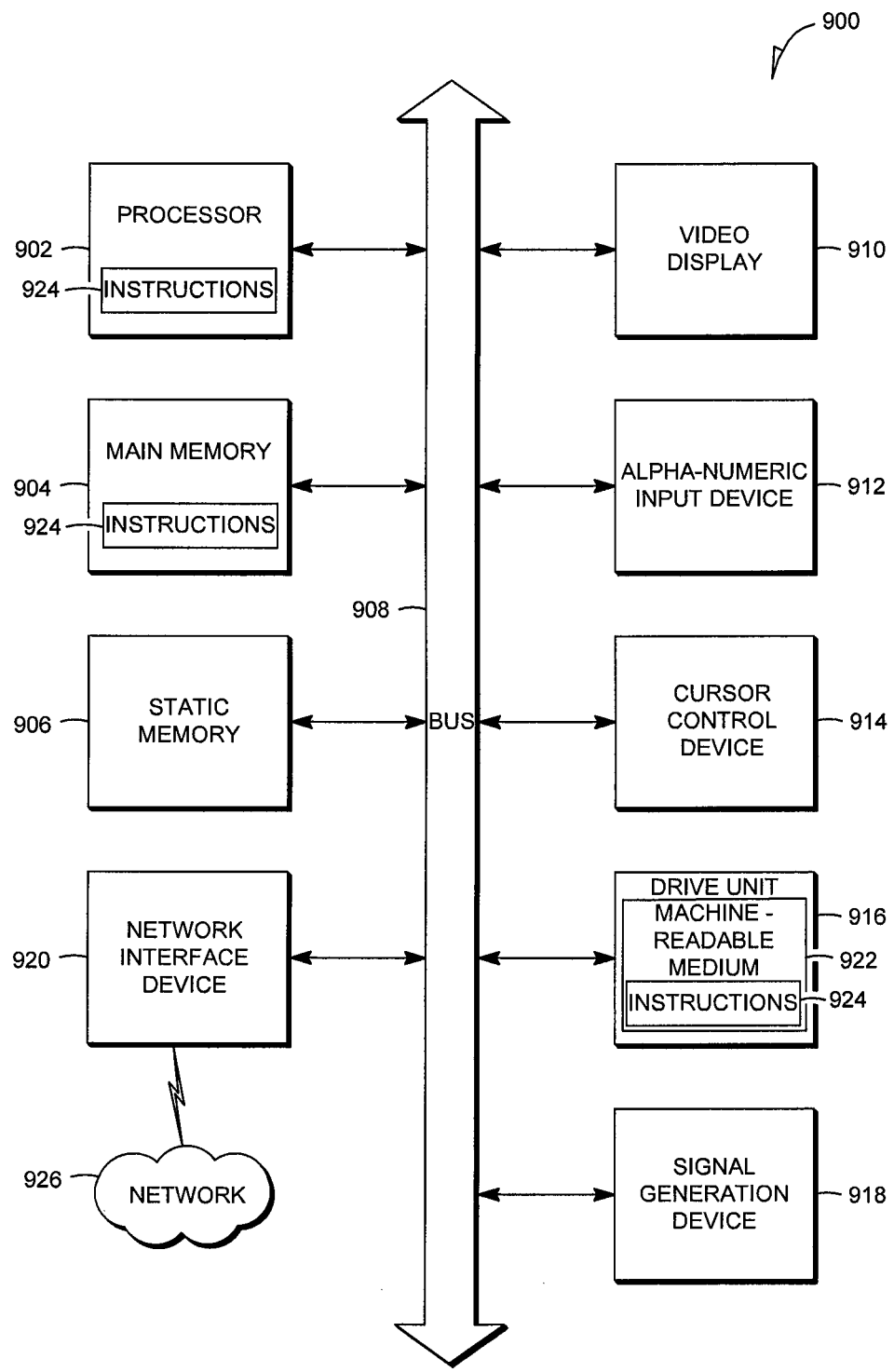
FIG. 9 is a diagrammatic representation of an example machine in the form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 909. The computer system 900 may further include a video display unit 910 (e.g., a liquid crystal display (LCD) or a cathode ray tube (CRT)). The computer system 900 also includes an alpha-numeric input device 912 (e.g., a keyboard), a user interface (UI) navigation device 914 (e.g., a cursor control device), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, with the main memory 904 and the processor 902 also constituting machine-readable media.

The software 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system to navigate a visual representation of a hierarchical structure has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:

using at least one processor coupled to a memory, causing presentation of a first visualization of a hierarchical data structure, the first visualization comprising:

a first stacked bar chart comprising a first plurality of segments, the first stacked bar chart representing a first level in the hierarchical data structure, a selected segment from the first plurality of segments representing a selected category from a first set of categories in the first level of the hierarchical data structure, respective areas occupied by segments from the first plurality of segments in the first stacked bar chart reflecting quantitative contributions of respective categories from the first set of categories to a numerical aspect assigned to the entire set of categories in the first level in the hierarchical data structure, the selected category comprising a second set of categories in a second level of the hierarchical data structure, and a first set of bars, each bar in the first set of bars corresponding to a respective category from the second set of categories, the first set of bars representing a quantitative breakdown of the second set of categories based on respective numerical values associated with categories from the second set of categories;

responsive to a first request associated with the selected segment, causing presentation of a second visualization of the hierarchical data structure, the second visualization comprising:
  a second stacked bar chart, the second stacked bar chart representing a second level in the hierarchical data structure and comprising a second plurality of segments, segments from the second plurality of segments representing categories from the second set of categories, the second stacked bar chart replacing the first stacked bar chart, and
  a second set of bars, each bar in the second set of bars corresponding to a respective category from the third set of categories, the second set of bars representing a quantitative breakdown of the third set of categories based on respective numerical values associated with categories from the third set of categories, the second set of bars replacing the first set of bars; and
responsive to a second request, causing presentation of a third visualization of the hierarchical data structure, the third visualization comprising the first stacked bar chart in addition to the second stacked bar chart and the second set of bars.

2. The method of claim 1, wherein the presenting of the quantitative breakdown of the selected section is in response to activating a first visual control associated with the selected segment.

3. The method of claim 1, wherein the selected segment is a default selected segment.

4. The method of claim 1, wherein the presenting of the first stacked bar chart and the second stacked bar chart on the same screen is driven by a grid underlying the viewing area for positioning of one or more strip charts and a bar graph.

5. The method of claim 1, wherein the first request is a double tap.

6. The method of claim 1, wherein the second request is a tap.

7. The method of claim 1, wherein the first strip chart comprises an overflow segment, the overflow segment representing two or more categories from the first set of categories.

8. A computer-implemented system comprising:
  a memory;
  at least one processor coupled to the memory;
  a data access module, implemented using the at least one processor, to access a hierarchical data structure; and
  a strip chart view generator, implemented using the at least one processor, to:
    cause presentation of a first visualization of the hierarchical data structure, the first visualization comprising:
  a first stacked bar chart comprising a first plurality of segments, the first stacked bar chart representing a first level in the hierarchical data structure, a selected segment from the first plurality of segments representing a selected category from a first set of categories in the first level of the hierarchical data structure, respective areas occupied by segments from the first plurality of segments in the first stacked bar chart reflecting quantitative contributions of respective categories from the first set of categories to a numerical aspect assigned to the entire set of categories in the first level in the hierarchical data structure, the selected category comprising a second set of categories in a second level of the hierarchical data structure, and
  a first set of bars, each bar in the first set of bars corresponding to a respective category from the second set of categories, the first set of bars representing a quantitative breakdown of the second set of categories based on respective numerical values associated with categories from the second set of categories;
responsive to a first request associated with the selected segment, cause presentation of a second visualization of the hierarchical data structure, the second visualization comprising;
  a second stacked bar chart, the second stacked bar chart representing a second level in the hierarchical data structure and comprising a second plurality of segments, segments from the second plurality of segments representing categories from the second set of categories, the second stacked bar chart replacing the first stacked bar chart, and
  a second set of bars, each bar in the second set of bars corresponding to a respective category from the third set of categories, the second set of bars representing a quantitative breakdown of the third set of categories based on respective numerical values associated with categories from the third set of categories, the second set of bars replacing the first set of bars; and
responsive to a second request, cause presentation of a third visualization of the hierarchical data structure, the third visualization comprising the first stacked bar chart in addition to the second stacked bar chart and the second set of bars.

9. The system of claim 8, wherein the strip chart view generator is to present the quantitative breakdown of the selected section in response to activating a first visual control associated with the selected segment.

10. The system of claim 8, wherein the selected segment is a default selected segment.

11. The system of claim 8, wherein the strip chart view generator is to utilize a grid underlying the viewing area for positioning of one or more strip charts and a bar graph.

12. The system of claim 8, wherein the first request is a double tap.

13. The system of claim 8, wherein the first strip stacked bar comprises an overflow segment, the overflow segment representing two or more categories from the first set of categories.

14. A machine-readable non-transitory storage medium having instruction data to cause a machine to perform operations comprising:
  causing presentation of a first visualization of a hierarchical data structure, the first visualization comprising:
    a first stacked bar chart comprising a first plurality of segments, the first stacked bar chart representing a first level in the hierarchical data structure, a selected segment from the first plurality of segments representing a selected category from a first set of categories in the first level of the hierarchical data structure, respective areas occupied by segments from the first plurality of segments in the first stacked bar chart reflecting quantitative contributions of respective categories from the first set of categories to a numerical aspect assigned to the entire set of categories in the first level in the hierarchical data structure, the selected category comprising a second set of categories in a second level of the hierarchical data structure, and
  a first set of bars, each bar in the first set of bars corresponding to a respective category from the second set of categories, the first set of bars representing a quantitative breakdown of the second set of categories based on respective numerical values associated with categories from the second set of categories;

responsive to a first request associated with the selected segment, causing presentation of a second visualization of the hierarchical data structure, the second visualization comprising;
- a second stacked bar chart, the second stacked bar chart representing a second level in the hierarchical data structure and comprising a second plurality of segments, segments from the second plurality of segments representing categories from the second set of categories, the second stacked bar chart replacing the first stacked bar chart, and
- a second set of bars, each bar in the second set of bars corresponding to a respective category from the third set of categories, the second set of bars representing a quantitative breakdown of the third set of categories based on respective numerical values associated with categories from the third set of categories, the second set of bars replacing the first set of bars; and responsive to a second request, causing presentation of a third visualization of the hierarchical data structure, the third visualization comprising the first stacked bar chart in addition to the second stacked bar chart and the second set of bars.

* * * * *